United States Patent
Wang et al.

(10) Patent No.: US 8,915,627 B2
(45) Date of Patent: Dec. 23, 2014

(54) PROTRUSION STRUCTURE PROCESSING METHOD OF BACKPLANE AND BACKPLANE

(76) Inventors: Lifeng Wang, Shenzhen (CN); Yuchun Hsiao, Shenzhen (CN); Yajun Yu, Shenzhen (CN); Yanxue Zhang, Shenzhen (CN)

( * ) Notice: Subject to any disclaimer, the term of this patent is extended or adjusted under 35 U.S.C. 154(b) by 0 days.

(21) Appl. No.: 13/582,421

(22) PCT Filed: Jul. 23, 2012

(86) PCT No.: PCT/CN2012/078996
§ 371 (c)(1),
(2), (4) Date: Sep. 2, 2012

(87) PCT Pub. No.: WO2014/008680
PCT Pub. Date: Jan. 16, 2014

(65) Prior Publication Data
US 2014/0016332 A1    Jan. 16, 2014

(30) Foreign Application Priority Data
Jul. 13, 2012   (CN) .......................... 2012 1 0243470

(51) Int. Cl.
*G02F 1/1333*   (2006.01)
(52) U.S. Cl.
CPC .................... *G02F 1/133308* (2013.01); *G02F 2001/133314* (2013.01)
USPC ............................................ 362/382; 349/58
(58) Field of Classification Search
CPC ............... G02F 1/133308; G02F 2001/133314
USPC ...................... 72/324–326, 332, 335; 349/58; 411/525, 526; 362/382
See application file for complete search history.

(56) References Cited

U.S. PATENT DOCUMENTS

| | | | | |
|---|---|---|---|---|
| 3,108,371 A | * | 10/1963 | Munse | 72/327 |
| 3,523,299 A | * | 8/1970 | Tinnerman | 411/372 |
| 2008/0055512 A1 | * | 3/2008 | Kim | 349/58 |

FOREIGN PATENT DOCUMENTS

| | | |
|---|---|---|
| CN | 2500406 Y | 7/2002 |
| CN | 2562095 Y | 7/2003 |
| CN | 1457276 A | 11/2003 |
| CN | 101324324 A | 12/2008 |
| CN | 101767147 A | 7/2010 |
| CN | 201880800 U | 6/2011 |
| CN | 102523407 A | 6/2012 |
| EP | 2177291 A1 | 4/2010 |
| JP | 2003236625 A | 8/2003 |
| JP | 2005279677 A | 10/2005 |

OTHER PUBLICATIONS

Shi Yuqing, Li Ling Feng, ACTA Armament Tarii vol. 30, No. 7, FEM Simulation on New Deep Drawing Process to Blank with Technique Holes.
Zhou Yapei, the International Searching Authority written comments, Apr. 2013, CN.

* cited by examiner

*Primary Examiner* — Nimeshkumar Patel
*Assistant Examiner* — Steven Horikoshi

(57) ABSTRACT

At least one stress concentration factor is arranged in a bending position of forming the protrusion structure on a surface of the backplane. Then, a shape of the protrusion structure is formed by stamping. In the present disclosure, because the bending position during stretching the protrusion structure is firstly configured with a plurality of stress concentration factors in the stretching process of the protrusion structure, when the protrusion structure is stretched, stress concentration occurs in the position with the stress concentration factors.

4 Claims, 4 Drawing Sheets

PROTRUSION STRUCTURE PROCESSING METHOD OF BACKPLANE AND BACKPLANE

This application is a national stage application of PCT application PCT/CN2012/078996 filed on Jul. 23, 2012, which is based on and priority to Chinese patent application 201210243470.1 filed on Jul. 13, 2012. The entirety of each of the above-mentioned applications is hereby incorporated by reference herein in its entirety.

TECHNICAL FIELD

The present disclosure relates to the field of liquid crystal display (LCD) devices, and more particularly to a backplane and a protrusion structure processing method of a backplane.

BACKGROUND

A typical backlight module generally includes a backplane, a middle frame, a light source, a light guide device, and an optical film. The backplane is generally formed by stamp molding of a sheet metal member. As shown in FIG. 1, a protrusion structure 8 is a feature on the backplane 1. A stretched height of the protrusion structure 8 has a close relationship with size of the protrusion structure 8. Generally, the stretched height of the protrusion structure 8 is less than or equal to half of a diameter of the protrusion structure 8. If higher stretching of protrusion structure is adopted, the protrusion structure 8 may tear at a base of the protrusion structure 8, and strength of backplane is affected.

FIG. 2 shows a general flow process of stretching the protrusion structure on a thin wall sheet metal member. Volume of the stretching part of the sheet metal member is not changed by the molding of the protrusion structure, but an area of the sheet metal member is expanded by stretching and a wall thickness of the sheet metal member is thinned, or the wall thickness of the protrusion structure is thinned compared with other parts on the sheet metal member.

SUMMARY

In view of the above-described problems, an aim of the present disclosure is to provide a protrusion structure processing method of a backplane and a backplane capable of enhancing protrusion structure strength on the backplane.

A purpose of the present disclosure is achieved by the following technical schemes: A protrusion structure processing method of a backplane comprises the following steps: A: Three bar-shaped openings are uniformly arranged in a bending position to be perpendicular to the bending position on a surface of a backplane. B: A shape of the protrusion structure is formed by stamping.

The purpose of the present disclosure is further achieved by the following technical schemes: A protrusion structure processing method of a backplane comprises the steps: A: At least one stress concentration factor is arranged in a bending position to form the protrusion structure on the surface of the backplane. B: The shape of the protrusion structure is formed by stamping.

In the step A, more than two stress concentration factors are arranged in the bending position to form the protrusion structure. The stress concentration factors are uniformly distributed in the bending position. All regions of the bending position of a root of the protrusion structure during processing are subject to stress release by arranging a plurality of uniformly distributed stress concentration factors. Thus, the bending position is prevented from tearing, and a strength of the bending position is enhanced.

In the step A, the stress concentration factors are openings arranged in the bending Position. The openings act as the stress concentration factors and have large structural mutation in the bending position. Thus, stress concentration in the non-opening part of the bending position is better alleviated.

The openings are bar-shaped openings that are perpendicular to the bending position. Because a deformation direction of the protrusion structure in the stretching process is perpendicular to the direction of the bending position, a better stress concentration effect is obtained by arranging the bar-shaped openings to be perpendicular to the bending position. And then, the stress concentration in a non-opening part is better alleviated.

Three bar-shaped openings are uniformly distributed in the bending position of the protrusion structure on the backplane. The three bar-shaped openings do not occupy too much area of the bending position of the protrusion structure. Thus, the strength of the molded protrusion structure is not affected. Meanwhile, a uniform and effective stress concentration region can be better provided, and the stress concentration in the non-opening position is alleviated.

A backplane comprises a plurality of protrusion structures arranged on the surface of the backplane. The bending position of the protrusion structure is configured with at least one stress concentration factor.

The bending position of the protrusion structure is configured with more than two stress concentration factors. The stress concentration factors are uniformly distributed in the bending position of the protrusion structure. All regions of the bending position of a root of the protrusion structure during processing are subject to stress release by arranging a plurality of uniformly distributed stress concentration factors. Thus, the bending position is prevented from tearing and the strength of the bending position is enhanced.

In the step A, the stress concentration factors are openings arranged in the bending position. The openings act as the stress concentration factors and have large structural mutation in the bending position. Thus, stress concentration in the non-opening part of the bending position can be better alleviated.

The openings are bar-shaped openings that are perpendicular to a bending line formed in the bending position. Because the deformation direction of the protrusion structure in the stretching process is perpendicular to the direction of the bending position, a better stress concentration effect can be obtained by arranging the bar-shaped openings to be perpendicular to the bending line in the bending position. And then, the stress concentration in the non-opening part can be better alleviated.

Three bar-shaped openings are uniformly distributed in the bending position of the protrusion structure on the backplane. The three bar-shaped openings do not occupy too much area of the bending position of the protrusion structure. Thus, the strength of the molded protrusion structure is not affected. Meanwhile, a better stress concentration effect can be obtained. The stress concentration in the non-opening position is alleviated.

In the present disclosure, because the bending position when stretching the protrusion structure is firstly configured with a plurality of stress concentration factors in the stretching process of the protrusion structure, when the protrusion structure is stretched, stress concentration occurs in the position with the stress concentration factors. Thus, the stress of the position where the stress concentration factors are not arranged is alleviated. Then, the phenomenon that the protrusion structure is torn during stretching is avoided. The strength of the protrusion structure is enhanced. And then, the protrusion structure with higher height can be processed. Or, under the condition that the height of the protrusion structure is constant, only thinner backplane material such as sheet metal member) is needed.

DETAILED DESCRIPTION

The present disclosure is further described in detail in accordance with the figures and one example.

The present disclosure provides a backplane processing method, comprising steps: A: At least one stress concentration factor is arranged in a bending position to form the protrusion structure on a surface of the backplane. B: A shape of the protrusion structure is formed by stamping.

The present disclosure is further described in detail in accordance with the figures and one example.

Figure 1:
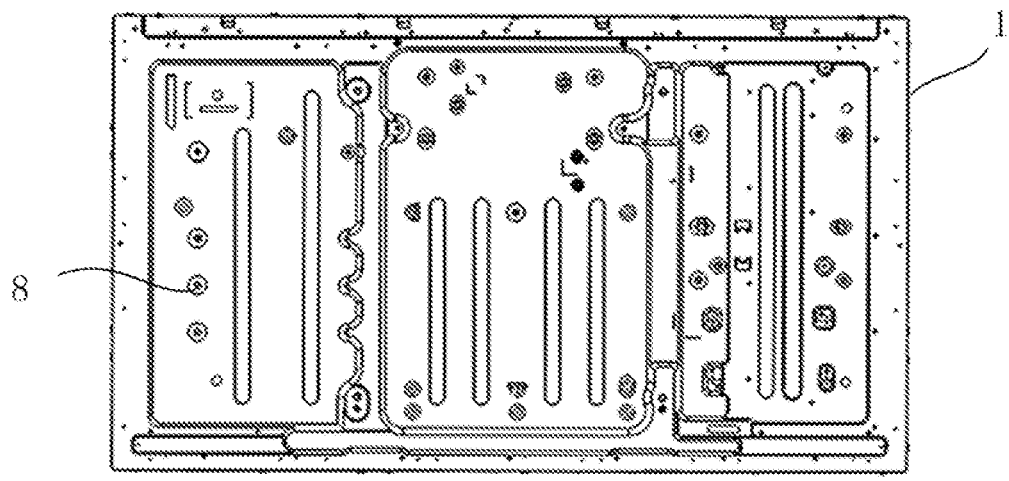
FIG. 1 is a simplified structural diagram of a backplane in the prior art.
Figure 2:
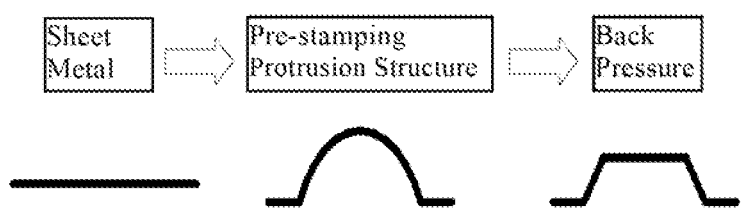
FIG. 2 is a schematic diagram of a processing technology of a protrusion structure on a backplane in the prior art.
Figure 3:
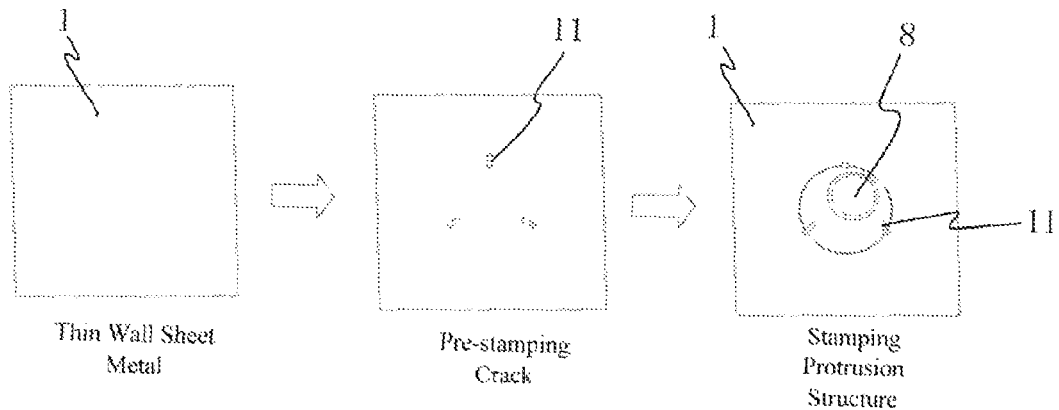
FIG. 3 is a schematic diagram of a processing technology of a protrusion structure on a backplane in an example of the present disclosure.

FIG. 3 is a schematic diagram of a processing technology of a protrusion structure on a backplane in an example of the present disclosure. A backplane 1 is a thin wall sheet metal member. When the protrusion structure on the backplane is processed, i.e. in the step A, firstly, a plurality of openings 11 that are distributed in a bending position on a surface of the backplane are stamped in the bending position to form the protrusion structure on the backplane 1 where the openings 11 act as stress concentration factors. Then, the openings 11 are stretched to form the protrusion structure 8. Optionally, the stress concentration factors are not limited to a form of the openings 11, and can also be grooves or depressions arranged in the bending position. However, the open structures have larger structural mutation in the bending position. Thus, the stress concentration in the non-opening part of the bending position can be better alleviated.

Figure 4:
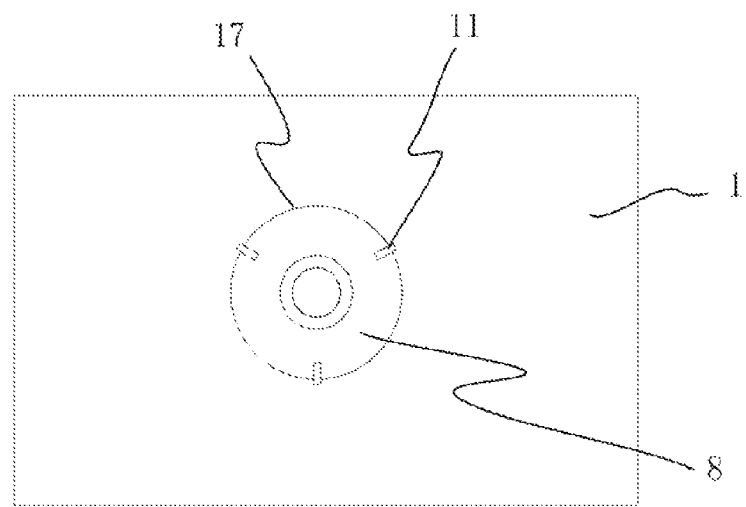
FIG. 4 is a local simplified structural diagram on a backplane in an example of the present disclosure.
Figure 5:
FIG. 5 is a sectional view of a protrusion structure in an example of the present disclosure.

As shown in FIG. 4 and FIG. 5, in the backplane obtained in the step of the example, the openings 11 are bar-shaped structures that are perpendicular to the bending position 17 of the protrusion structure 8. Because a deformation direction of the protrusion structure 8 in the stamping process is perpendicular to the direction of the bending position 17, a better stress concentration effect can be obtained by arranging the bar-shaped openings 11 to be perpendicular to the bending position 17. And then, the stress concentration in the non-opening part 11 of the bending position 17 can be better alleviated.

As shown in FIG. 4, in the example, the bending position 17 of the protrusion structure 8 is configured with three uniformly distributed bar-shaped openings 11. All regions of the bending position of a root of the protrusion structure 8 during processing are subject to stress release by arranging uniformly distributed bar-shaped openings 11 as stress concentration factors. Thus, the bending position is prevented from tearing and strength of the protrusion structure 8 is enhanced. The three bar-shaped openings 11 do not occupy too much area of the bending position 17 of the protrusion structure 8. Thus, strength of the molded protrusion structure is not affected. Meanwhile, a uniform and effective stress concentration region can be better provided. The stress concentration in the non-opening position is alleviated.

Figure 6:
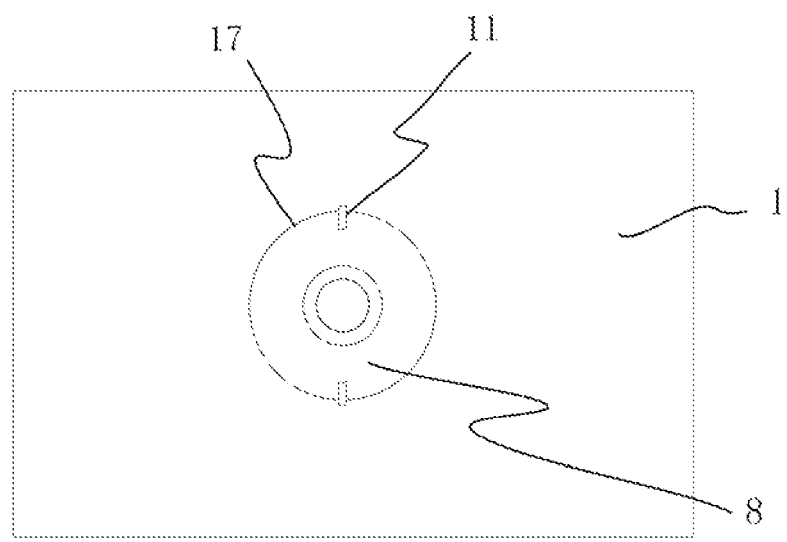
FIG. 6 is a simplified structural diagram of another protrusion structure in an example of the present disclosure.
Figure 7:
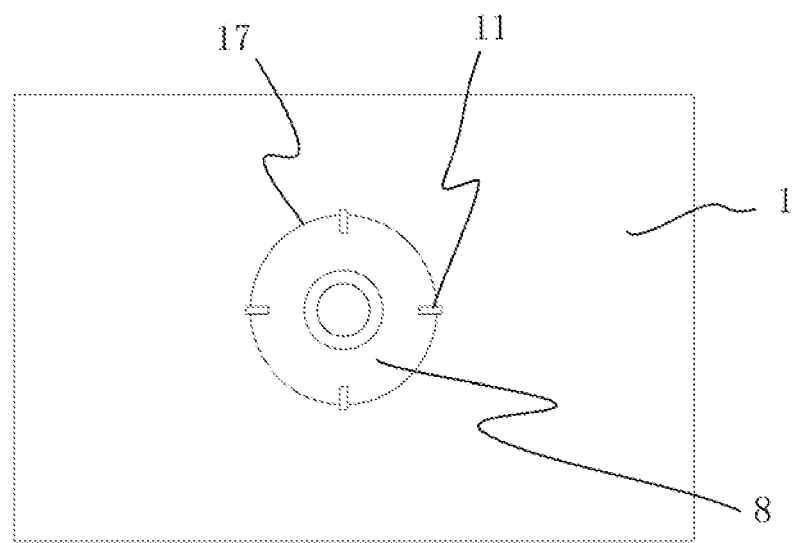
FIG. 7 is a simplified structural diagram of another protrusion structure in an example of the present disclosure.

Optionally, as shown in FIG. 6 and FIG. 7, the bending position 17 of the protrusion structure 8 can also be configured with two or four bar-shaped openings 11, and even can be configured with one bar-shaped opening 11.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A backplane, comprising:
a plurality of protrusion structures arranged on a surface of the backplane;
wherein a bending position of the protrusion structure is configured with at least one stress concentration factor, wherein more than two stress concentration factors are arranged in the bending position of the protrusion structure, and wherein the stress concentration factors are uniformly distributed in the bending position of the protrusion structure, wherein the stress concentration factors are openings arranged in the bending position, wherein the openings are bar-shaped openings that are perpendicular to a bending line formed in the bending position, wherein the bar-shaped openings are isolated from each other.

2. The backplane of claim 1, wherein three bar-shaped openings are uniformly distributed in the bending position of the protrusion structure on the backplane.

3. The backplane of claim 1, wherein two bar-shaped openings are uniformly distributed in the bending position of the protrusion structure on the backplane.

4. The backplane of claim 1, wherein four bar-shaped openings are uniformly distributed in the bending position of the protrusion structure on the backplane.

* * * * *